United States Patent [19]
Keeley

[11] Patent Number: 6,138,174
[45] Date of Patent: Oct. 24, 2000

[54] INDUSTRIAL CONTROL SYSTEM PROVIDING REMOTE EXECUTION OF GRAPHICAL UTILITY PROGRAMS

[75] Inventor: Thomas M. Keeley, Brookfield, Wis.

[73] Assignee: Rockwell Technologies, LLC, Thousand Oaks, Calif.

[21] Appl. No.: 08/977,469

[22] Filed: Nov. 24, 1997

[51] Int. Cl.[7] .................................................. G06F 3/00
[52] U.S. Cl. ............................. 710/5; 345/503; 345/526; 703/24
[58] Field of Search ......................... 712/1; 345/800.21, 345/200.83, 200.31, 674, 503, 526; 364/146; 710/109, 5; 711/149; 703/13, 24

[56] References Cited

U.S. PATENT DOCUMENTS

| | | | |
|---|---|---|---|
| 4,414,624 | 11/1983 | Summer, Jr. et al. | 395/800.21 |
| 4,527,237 | 7/1985 | Frieder et al. | 395/200.83 |
| 4,888,726 | 12/1989 | Struger et al. | 395/200.31 |
| 4,965,718 | 10/1990 | George et al. | 395/674 |
| 4,972,314 | 11/1990 | Getzinger et al. | 711/149 |
| 5,201,049 | 4/1993 | Shorter | 395/406 |
| 5,764,507 | 6/1998 | Chuo | 364/147 |
| 5,812,394 | 9/1998 | Lewis et al. | 364/146 |
| 5,819,050 | 10/1998 | Boehling et al. | 710/104 |

*Primary Examiner*—John A. Follansbee
*Attorney, Agent, or Firm*—Keith M. Baxter; John J. Horn; William R. Walbrun

[57] ABSTRACT

Graphically intense utility programs for an industrial control system, requiring the same operating system as is used to run the control program, are run on remote computers having insufficient memory or processing power to support the operating system, by using a shell program executing on a control-computer to run the utilities. The shell program uses the control-computer's operating system except for calls to the remote computer's display or its manual input devices which are routed to a virtual machine updated periodically by communication with the remote machine.

8 Claims, 2 Drawing Sheets

INDUSTRIAL CONTROL SYSTEM PROVIDING REMOTE EXECUTION OF GRAPHICAL UTILITY PROGRAMS

CROSS-REFERENCE TO RELATED APPLICATIONS

STATEMENT REGARDING FEDERALLY SPONSORED RESEARCH OR DEVELOPMENT

BACKGROUND OF THE INVENTION

The invention relates to industrial control systems including programmable controllers, and in particular to an industrial control system employing utility programs such as graphical editors and display programs.

Industrial control systems, such as those described in U.S. Pat. Nos. 3,810,110; 3,942,158; 4,165,534; and 4,442,504, are typically centralized, general-purpose computers that may be connected to industrial equipment through I/O (input/output) modules to operate and control the industrial equipment according to a stored control program. The stored control program runs in real-time to provide outputs to the controlled process as electrical signals connected to actuators and the like, the outputs being based on the logic of the control program and inputs received from sensors on the controlled process.

The demands of real-time processing have historically required a special purpose control-computer capable of rapidly processing the required large amounts of input and output data. Frequently, the control program for such special computers is written in a relay ladder language adapted to the demands of real-time control. In relay ladder logic, the input and output signals may be represented graphically as contact symbols and coil symbols arranged in a series of rungs spanning a pair of vertical power rails.

Often a separate computer is used to write and edit the control program using these graphical symbols. The completed control program is converted to an executable file and loaded into the control-computer for execution.

During execution of the control program, peripheral-computers may communicate with the control-computer directly or through a network to execute other programs to display a real-time animation of the program or of the operation of the controlled equipment. These programs, not necessary for the core function of the industrial control system, but assisting in the development, troubleshooting or monitoring of the control process, will generally be referred to as utility programs.

With the increasing processing power of general purpose "desktop" computers, and in particular those based on microprocessors manufactured by the Intel Corporation, special purpose control-computers may no longer be required for many low-end control applications. "Soft PLC" (programmable logic controller) programs exist that allow a high-end desktop computer, often with multiple processors, to simulate the operation of a special purpose control-computer. Such soft PLC programs execute ladder logic type control programs and control I/O modules to communicate control signals between the desktop computer and the controlled process.

In such soft PLC systems, the peripheral-computers may also be desktop computers.

The large installed base of desktop computers has resulted in powerful and inexpensive computer languages and development systems using desktop operating systems, principally the Windows graphical operating system manufactured by Microsoft Corporation. The utility programs executed by the peripheral-computers, and the soft PLC program itself, are conventionally written using these desktop languages and development systems. The resulting utility programs make extensive use of graphical icons and symbols and require substantial computer resources in terms of memory and processing power to run.

Because of the rigors of the industrial environment, specialized versions of desktop computers, hardened to factory conditions, may be used. Ideally, these hardened desktop computers, when used as peripheral-computers, omit certain components of the desktop computer used to run the soft PLC program, for example, high-speed processors, extra memory and disk drives. These components are costly, create cooling and reliability problems in the field, and may, in the case of disk drives, reduce the ruggedness of the peripheral-computer.

Unfortunately, the latest utility programs created with the desk top operating systems may not operate with reduced component computer systems used as peripheral-computers.

BRIEF SUMMARY OF THE INVENTION

The present invention allows utility programs, using the same operating system as that used by a control-computer, to be executed on peripheral-computers having insufficient computing resources to support that operating system or possibly even the utility program. A communication program run on the peripheral-computer serves to relay keyboard, mouse or touch screen information from the peripheral-computer to the control-computer and to receive graphical display information from the control-computer for display by the peripheral-computer. A shell program operates on the control-computer together with the utility program to simulate a virtual machine having the operating system needed by the utility program. All calls between the operating system and the utility program are handled within the control-computer except those related to reading the keyboard, touchscreen and mouse or writing to the display which are handled by the communication program. As a result, the peripheral-computer need not support the operating system necessary to run the utilities but only the relatively compact communications program including screen display and keyboard, touchscreen or mouse reading routines and the like.

Specifically, the present invention provides an industrial control system executing a utility program intended to generate graphical representations of the data of the industrial control system when executed on a stand-alone computer. The industrial control system includes at least one I/O module providing electrical connections with a control process and a peripheral-computer having a graphic display and manual input device and executing a communications program to transmit data from the manual input device to a control-computer and to display graphics data received from the control-computer on the graphics display.

The control-computer exchanges data with the peripheral-computer and the I/O module over a communication link and includes at least one processor and electronic memory. The memory holds an operating system providing an interface between the control-computer and programs executed on the control-computer, and the memory holds control data including input and output data exchanged through the I/O module with the controlled process and a control program for processing the input and output data when executed by the control-computer under the operating system. The memory also holds one or more utility program executable on a stand-alone computer running the operating system. The utility program reads the control data to produce graphic representations of the control data on a graphic display in response to input from a manual input device. The memory also holds a shell program simulating the stand-alone computer running the operating system to operate the utility program by receiving data from the manual input device of the peripheral-computer to the utility program and transmitting graphic data to the peripheral-computer.

Thus, it is one object of the invention to permit utility programs to appear to be operated away from the control-computer on peripheral-computers having insufficient hardware capability to run the operating system of the control-computer or the utility program itself. In this way the latest operating system and its associated development tools may be used for all parts of the industrial control system without undue hardware burdens.

It is another object of the invention to localize the data transfer requirements of utility programs. By placing the utility programs in the control-computer their access to control data is improved.

It is another object of the invention to centralize the data storage requirements of the industrial control system improving performance and simplifying protection of critical data at a single location of the control-computer.

The communication link may have a high priority and low priority channel and the control program may operate so that the control-computer receives data from the manual input device of the peripheral-computer and transmits the graphic data to the peripheral-computer on the low priority channel. Further, the control program may operate so that the control-computer exchanges input and output data with the I/O module on the high priority channel. In addition, the control-computer may have multiple processors assignable among multiple processing tasks of different priority and the control program may be given a higher priority than the utility and shell programs.

Thus, it is another object of the invention to permit the control-computer to execute utility functions without jeopardizing the real-time control nature of the control process.

The foregoing and other objects and advantages of the invention will appear from the following description. In this description, references made to the accompanying drawings which form a part hereof in which they are shown by way of illustration a preferred embodiment of the invention. Such embodiment does not necessarily represent the full scope of the invention however, and references must be made therefore to the claims for interpreting the scope of the invention.

DETAILED DESCRIPTION OF THE INVENTION

Figure 1:
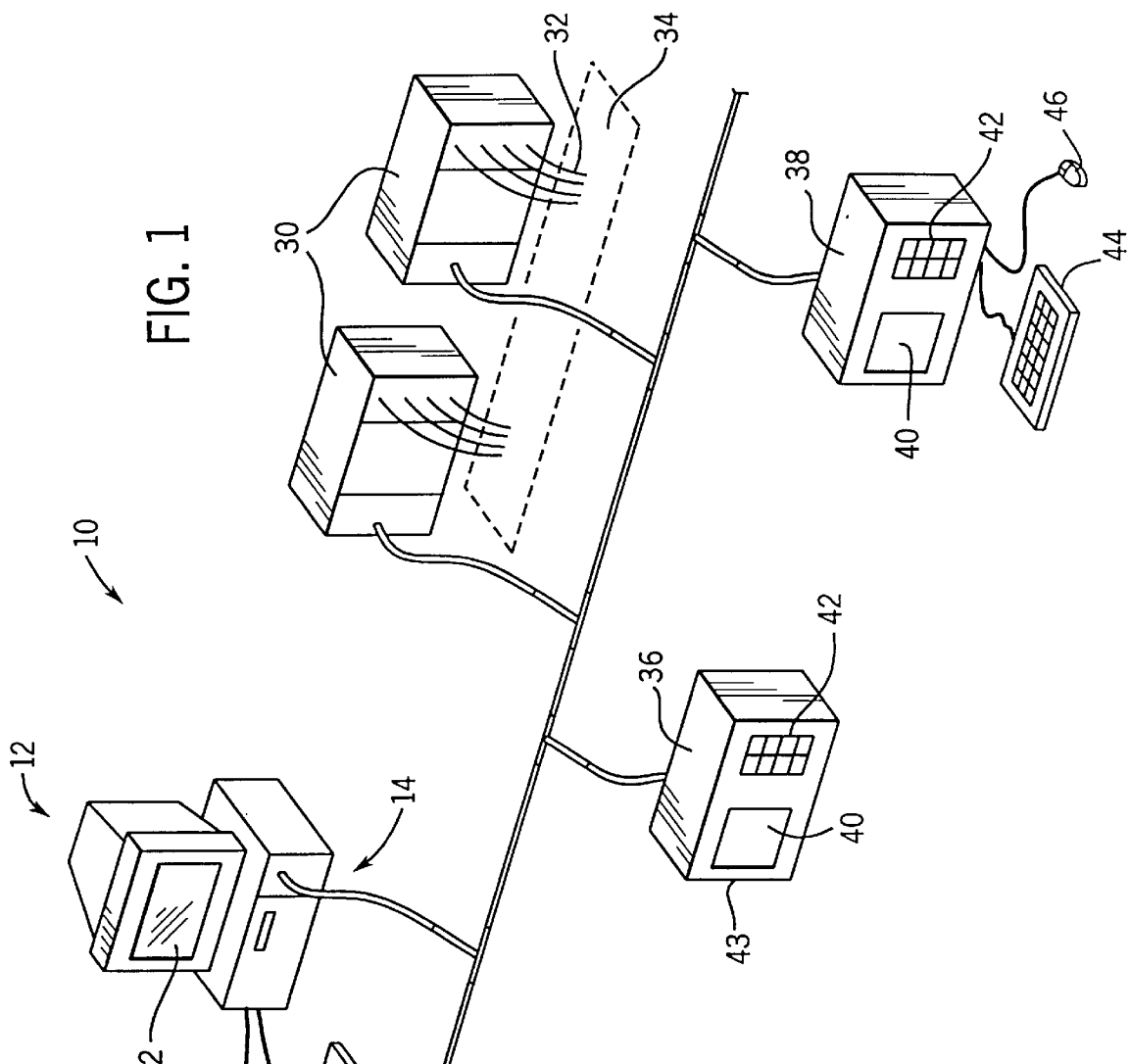
FIG. 1 is a perspective view of an industrial control system having a control-computer and remote I/O racks connected on a common communication link also communicating with several peripheral-computers for displaying control data or inputting information from a human operator.

Referring now to FIG. 1, an industrial control system 10 includes a desk top control-computer 12 having an internal communication module 14 allowing it to send and receive messages on a high-speed serial link 18. The control-computer 12 includes a video display 22, keyboard and mouse 24 as are well known in the art.

The serial communication link 18 may connect the control-computer 12 to one or more remote I/O modules 30 which have I/O lines 32 to a controlled process 34 or the like. The I/O modules 30 receive data from the control-computer 12 over the serial communication link 18 to provide control signals to the process 34 and sense process variables from process 34 to relay them through serial communication link 18 to the control-computer 12.

Also attached to the serial communication link 18 are peripheral-computers 36 and 38 having display screens 40 for displaying control data related to the control of the process 34. The peripheral-computer 36 has a keypad 42 and or touchscreen 43 and the peripheral-computer 38 has a keyboard 44 and mouse 46 for the entry of data by human operator. The peripheral-computers 36 and 38 may be used for editing the control program executed by the control-computer 12 or for the display of process variables allowing the monitoring of the process 34 or for the entry of user commands.

Figure 2:
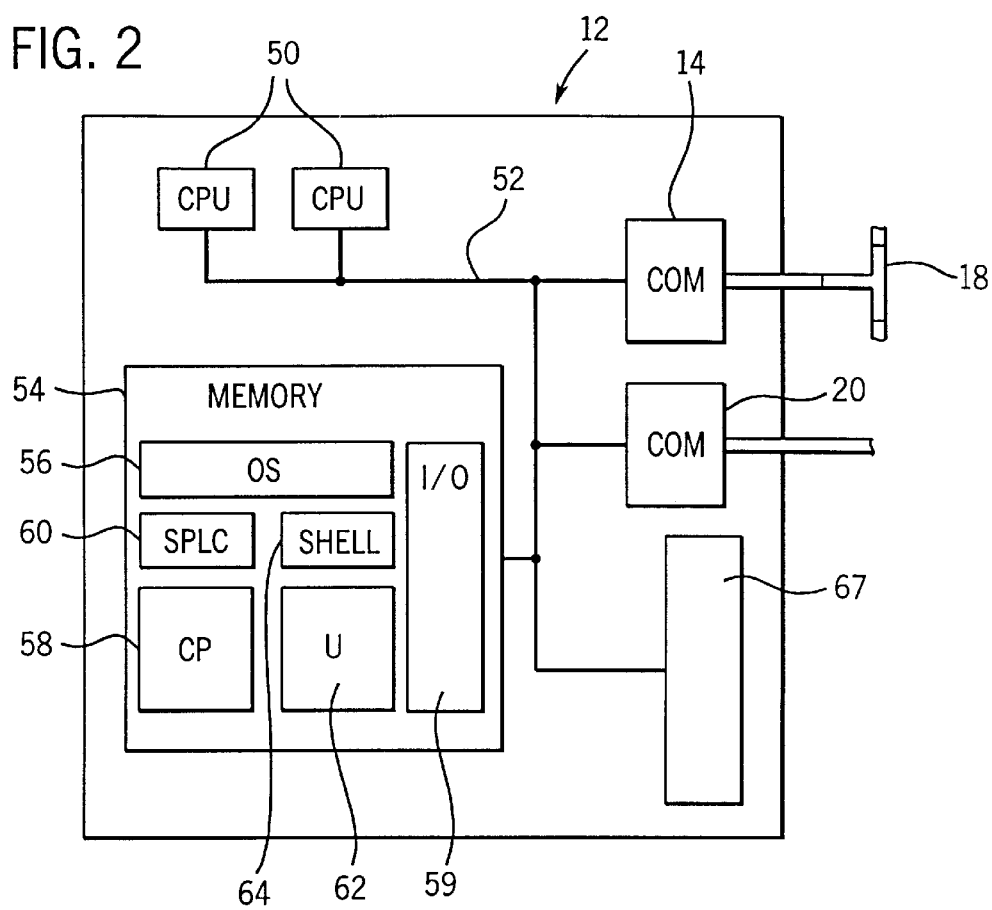
FIG. 2 is a block diagram of the control-computer of FIG. 1 showing schematic representations of the programs and data held in memory.

Referring now to FIGS. 1 and 2, the control-computer 12 includes one or more microprocessors 50, such as the Pentium microprocessors manufactured by Intel.

The processors 50 communicate via bus 52 with memory 54 holding an operating system 56 such as the Windows NT operating system manufactured by Microsoft Corporation as is generally understood in the art. The Intel processor 50 and Microsoft Windows operating system produce the so-called "Wintel" hardware platform having wide availability on a commercial basis.

The memory 54 also includes a control program 58 used for controlling the process 34. The control program 58 is executed by a soft PLC (programmable logic controller) program 60 running as an application under the operating system 56 to simulate a conventional industrial control system executing the control program 58. Soft PLC programs 60 are available commercially from a number of suppliers and serve to either interpret or compile a control program 58 produced with conventional editing programs on a Wintel type platform.

Also contained in memory 54 for execution by the processors 50 is a utility program 62 intended for operation under the operating system 56. Many utility programs are available to provide for animation of the control of process 34 or to display the process variables transmitted on I/O lines 32 on a peripheral-computer. Utility program 62 may alternatively be an editor for the control program 58 displaying graphical representations of that control program 58 and allowing editing by a user. Utility program may also track the process variables to create statistical analysis of the data for the user. Example utility program suitable for use with the present invention include those commercially available from WonderWare Corporation of Irvine, Calif. under the tradenames of InTouch, InTrack, InControl, InBatch, and InSupport.

The memory 54 also includes a shell program 64 serving as an intermediary between the utility program and the operating system 56 as will be described further below.

Memory 54 also includes an I/O table 59 holding data values indicating the state of inputs and outputs from and to I/O modules 30. The control program 58, when executed, reviews data stored in I/O table 59 to determined the current states of outputs to and inputs from control process 34.

Bus 52 also connects to communication module 14 allowing the transmission of data on serial communication link 18 and in particular the updating of the I/O table 59. The link 20 is also connected to the bus 52 to allow data to be exchanged with peripheral-computer 21. Other peripherals 67 as are understood in the art may also be connected to bus 52.

Figure 3:
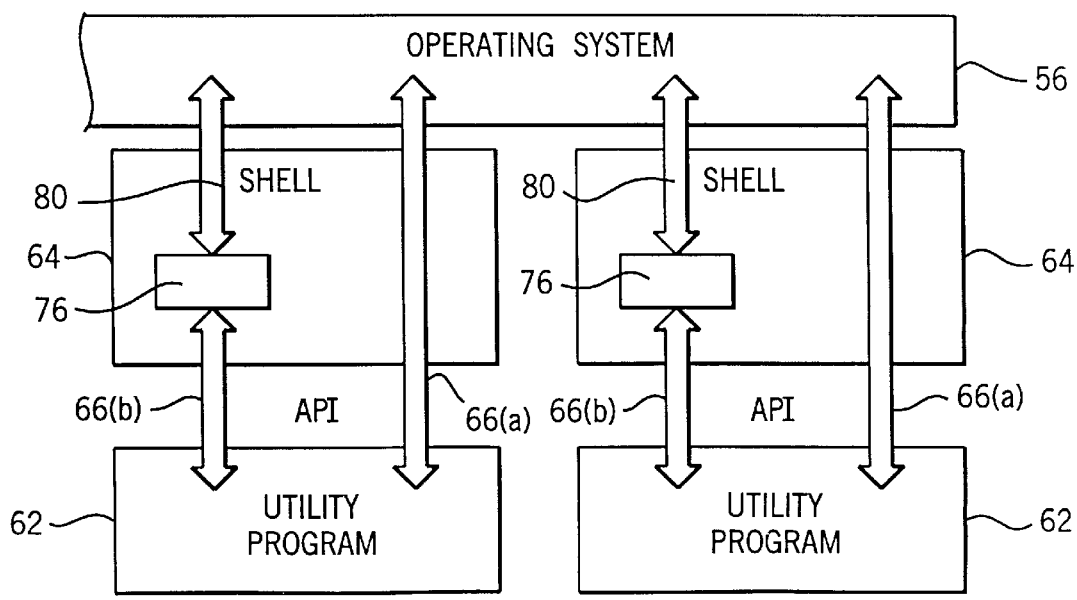
FIG. 3 is a detailed representation of the memory of FIG. 2 showing the operation of the shell program as an intermediary between the operating system and utility programs.

Referring now to FIG. 3, one or more utility programs 62 intended for operation under the operating system 56, may be executed under individual shell programs 64. The utility programs 62 communicate with the operating system 56 by application programmer interface calls or API calls to the operating system 56. Thus when the utility program 62 needs data from a device such as the keyboard, an API call fetches keyboard information. Similarly, information output to a device such as a video monitor is output via an API call. The shell programs 64 each generally simulate the operation of a stand-alone computer having the operating system 56 by selectively passing these API calls from the utility program 62 to the operating system 56 and selectively returning the results of the calls to the utility program 62. The shells 64 are thus positioned between the utility program 62 and the operating system 56 to receive API calls 66 by the utility program 62. A shell system suitable for use in the Wintel environment is commercially available for Citrix of Fort Lauderdale, Fla. under the tradename WinFrame.

Figure 4:
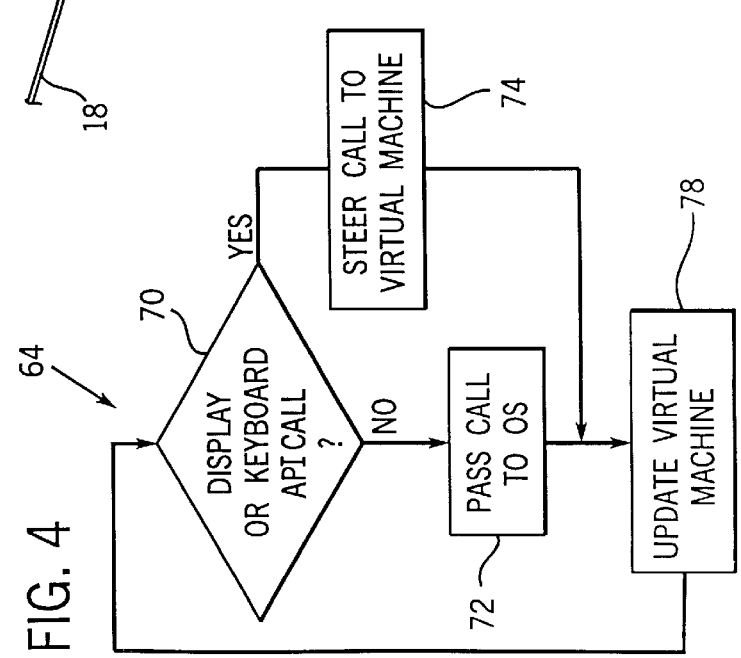
FIG. 4 is a flowchart showing the operation of the shell in allowing execution of utility programs on the control-computer with the appearance of being located at the remote peripheral-computers.

Referring now also to FIG. 4, as mentioned, only selected API calls are communicated between the utility program 62 and the operating system 56 by the shell 64. The shell program 64 monitors the API calls to be communicated directly with the operating system. As indicated by decision block 70 if the particular API call is a display or keyboard call intended for the display or keyboard of the stand-alone computer simulated by the shell 64, then the shell program 64 branches to block 74 and the call is directed to a virtual machine represented by a buffer 76 forming part of the shell 64. For example, in the case that the API call is intended as a write to display by the utility program 62, then the written information is written to the buffer 76 as if it were the display of a stand-alone computer. Alternatively, if the API call is a call to read the keyboard or mouse, information from the buffer 76 is read instead and that information is returned to the utility program 62 as if it came from the keyboard or mouse of a stand-alone computer. Each utility program 62 has its own shell 64 providing its own buffer space 76 unique to that utility program.

Similarly, the operating system 56 may make calls 80 to the buffer 76, for example to read memory for the purpose of satisfying an API call 66. The handling of these calls may be performed by the multiprocessor features of the operating system 56.

If the API call 66(*a*) from the utility 62 is not a display or keyboard call as described above, then at process block 72 the call 66(*a*) is passed through directly to the operating system 56. These calls 66(*a*) are received by the operating system 56 which answers them according to the conventions of the operating system 56.

Periodically, the shell 64 will initiate, as indicated by process block 78, an updating of the buffer 76 of the virtual machine by an call 80 to the operating system 56 requesting transmission of the desired information over the communication module 14 between the control-computer 12 and the peripheral-computers 36 or 38.

Periodically, as indicated by process block 78, display information contained in the buffer 76 is forwarded to the display screens 40 of one of peripheral-computers 36 and 38 and keyboard information from those peripheral-computers 36 and 38 is stored in buffer 76 for later API calls.

The display information will be graphical representations of the control data read from the I/O table 59 or the control program 58.

As such, the utility programs which may execute direct memory reads to APIs, have rapid access to the control data without the need communication on the serial communication link 18. The video data of the graphical representations is transmitted on the serial link to the peripheral-computers 36 and 38 in a compressed form according to compression algorithms well known in the art.

The serial communication link 18 may include high and low priority channels, the high priority channel typically providing for isochronous data transmission as is critical to real-time process control. The updating of the I/O table 59 will be accomplished with the high priority channel of serial communication link 18 whereas the transmission of graphic data and keystroke data to and from the peripheral-computer will be transmitted by the low priority channel.

When the operating system 56 allows for high and low priority tasks, the execution of the soft PLC program 60 and control program 58 will be designated as a higher priority then the execution of the shell program 64 and the utility program 62.

The shell program 64 thus simulates a stand-alone machine by providing API calls to a display or keyboard via the buffer 76 and processing other API calls with the operating system 56. In this way, the peripheral-computers 36 and 38 need not have sufficient hardware to support the operating system 56.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. An industrial control system executing utility programs intended to generate graphical representations of the data of the industrial control system when executed on a computer, the industrial control system comprising:

(a) an I/O module providing electrical connections with a controlled process;

(b) a peripheral-computer having a graphics display and a user input device and executing a communications program to transmit data from the user input computer and to display graphics data received from the control-computer on the graphics display;

(c) a communications link;

(d) a control-computer spatially removed from the peripheral-computer and having a separate bus structure therefrom and exchanging data with the peripheral-computer and the I/O module over the communications link, the control-computer including at least one processor and an electronic memory, the memory holding:

(i) an operating system providing an interface between the control-computer and only programs executed on the control-computer;

(ii) control data including input and output data exchanged through the I/O module with the controlled process and including the control program for processing the input and output data when executed by the processor under the operating system;

(iii) a utility program executable on a stand-alone computer running the operating system, the utility program reading the control data to produce a graphic representation of the control data on a graphics display in response to input from a user input device;

(iv) a shell program when executed by the processor of the control-computer simulating the stand-alone computer running the operating system to execute the utility program by receiving data from the user input device of the peripheral-computer and transmitting graphic data to the graphics display of the peripheral computer;

whereby the peripheral computer does not have the operating system and whereby the utility program may be virtually executed remotely from a peripheral-computer having insufficient processing capability to run the utility program or the operating system required by the utility program.

2. The industrial control system of claim 1 wherein the communications link has a high priority and low priority channel and wherein the wherein control program operates so that the control-computer receives data from the manual input device of the peripheral-computer and transmits the graphic data on the low priority channel and;

wherein the shell program operates so that the control-computer exchanges the input and output data with the I/O module on the high priority channel.

3. The industrial control system of claim 1 wherein the graphic data are transmitted in compressed form to the peripheral-computer.

4. The industrial control system of claim 1 wherein the control-computer has multiple processors assignable among multiple processing tasks of different priority and wherein the control program is given higher priority than the utility and shell programs.

5. The industrial control system of claim 1 wherein the manual input device is an alphanumeric keyboard and a cursor control device.

6. The industrial control system of claim 1 wherein the utility program displays a graphical representation of the control program.

7. The industrial control system of claim 6 wherein the utility program received data from the manual input device of the peripheral-computer to change the control program.

8. The industrial control system of claim 1 wherein the utility program displays a graphical representation of the input and output data.

* * * * *